US010293795B2

(12) United States Patent
Herrmann et al.

(10) Patent No.: US 10,293,795 B2
(45) Date of Patent: May 21, 2019

(54) HYDRAULIC VALVE SYSTEM FOR ACTUATING A PARKING LOCK DEVICE

(71) Applicant: ZF Friedrichshafen AG, Friedrichshafen (DE)

(72) Inventors: Markus Herrmann, Scheidegg (DE); Thilo Schmidt, Meckenbeuren (DE); Tobias Rolser, Berg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 104 days.

(21) Appl. No.: 15/629,907

(22) Filed: Jun. 22, 2017

(65) Prior Publication Data

US 2017/0369040 A1 Dec. 28, 2017

(30) Foreign Application Priority Data

Jun. 24, 2016 (DE) ........................ 10 2016 211 389

(51) Int. Cl.

| | |
|---|---|
| ***F16H 63/34*** | (2006.01) |
| ***B60T 1/00*** | (2006.01) |
| ***B60T 1/06*** | (2006.01) |
| ***B60T 11/28*** | (2006.01) |
| ***F15B 13/04*** | (2006.01) |
| ***F16D 63/00*** | (2006.01) |

(Continued)

(52) U.S. Cl.

CPC .............. *B60T 1/005* (2013.01); *B60T 1/062* (2013.01); *B60T 11/28* (2013.01); *B60T 13/662* (2013.01); *B60T 13/686* (2013.01); *F15B 13/0402* (2013.01); *F16D 63/006* (2013.01); *F16H 63/3458* (2013.01); *F16H 63/3483* (2013.01)

(58) Field of Classification Search

CPC ................. B60T 13/662; B60T 13/686; F16H 2061/1252; F16H 63/3458

See application file for complete search history.

(56) References Cited

U.S. PATENT DOCUMENTS 8,033,106 B2 * 10/2011 Gierer ................. F16H 61/0021 475/120
9,435,422 B2 * 9/2016 Herrmann ........... F16H 57/0413

(Continued)

FOREIGN PATENT DOCUMENTS

DE 102013209932 A1 12/2014
DE 102015211298 A1 12/2016

*Primary Examiner* — David R Morris
(74) *Attorney, Agent, or Firm* — Dority & Manning, P.A.

(57) ABSTRACT

An electrohydraulic transmission control system having a parking lock valve by which a parking lock cylinder of a parking lock device can be charged with an actuation pressure adjustable in an operating-state-dependent manner by at least one pilot pressure adjustable in the region of an electrohydraulic pressure adjuster and/or one pressure source. Above a defined actuation pressure level, the parking lock valve is held in a defined operating state in which the actuation pressure can be applied to the parking lock cylinder. The actuation and pilot pressures can be applied to a valve device such that when the actuation and pilot pressure levels approximately correspond to one another, the region of the control system which conducts the actuation pressure is operatively connected, upstream of the parking lock valve, to a pressure region in the region of the valve device with a pressure lower than the defined actuation pressure level.

15 Claims, 2 Drawing Sheets

(51) Int. Cl.

| | |
|---|---|
| ***B60T 13/66*** | (2006.01) |
| ***B60T 13/68*** | (2006.01) |

(56) References Cited

U.S. PATENT DOCUMENTS

| | | | | |
|---|---|---|---|---|
| 2009/0107136 | A1* | 4/2009 | Gierer | F16H 61/0021 60/459 |
| 2015/0114497 | A1* | 4/2015 | Herrmann | F16H 57/0413 137/599.14 |
| 2016/0369893 | A1* | 12/2016 | Herrmann | B60T 11/28 |
| 2017/0370468 | A1* | 12/2017 | Herrmann | B60T 1/005 |

* cited by examiner

HYDRAULIC VALVE SYSTEM FOR ACTUATING A PARKING LOCK DEVICE

FIELD OF THE INVENTION

The invention relates generally to an electrohydraulic transmission control system for actuating a parking lock device.

BACKGROUND

The applicant's patent application DE 10 2015 211 298.5, which does not constitute a prior publication, discloses a hydraulic system of an automatic transmission having a hydraulically actuable parking lock unit. A parking lock valve is configured with multiple valve pockets formed in the region of a valve housing, by which an actuation pressure of the parking lock unit can be applied to said parking lock unit, wherein the actuation pressure is dependent on a supply pressure. The valve pockets can be placed in operative connection with one another, or separated from one another, by a valve slide which is longitudinally displaceable in the valve housing. The valve slide is spring-loaded in the direction of a first axial position which corresponds to a first operating state of the parking lock valve and in which an actuation pressure can be applied to the parking lock unit to transition the parking lock into the engaged operating state. In the region of a control surface of the valve slide, a pressure signal acting in the direction of a second axial position of the valve slide, which corresponds to a second operating state of the parking lock valve, can be introduced by applying an actuation pressure to the parking lock unit, the actuation pressure transfers a parking lock of the parking lock unit into the disengaged operating state.

If a fault arises in the transmission system during normal operation with the parking lock disengaged, the electrical supply of the transmission actuators is deactivated and the automatic transmission switches to so-called hydraulic emergency operation. During hydraulic emergency operation, the parking lock valve is held in the operating state which corresponds to the disengaged operating state by the pressure in the primary actuation pressure circuit in the region of a control surface of the valve slide of the parking lock valve, the control surface corresponding to a differential surface between two facing face surfaces of two valve slide sections configured with different diameters, counter to the spring force, until the actuation pressure falls below a defined pressure threshold which is dependent on the size of the differential surface and on the spring force.

Said pressure threshold is configured for driving states in which a clutch gear logic is implemented without actuation of a shift element by the pressure signal. In the absence of a pressure signal and in the presence of a simultaneously low torque to be transmitted via the automatic transmission, the hydraulic system is operated with a low actuation pressure level in order to improve an efficiency of the automatic transmission. This means that, for the least possible power consumption of the transmission system, it is sought to achieve the lowest possible actuation pressures in the consumption-relevant operating range. This however has the result that the self-holding pressure of the parking lock valve lies below the minimum actuation pressure level, because otherwise, the parking lock cannot, in the presence of low actuation pressures, be held any longer in the disengaged operating state by the actuation pressure.

Owing to the selection of the features of the characteristic curves of the actuators, the shift elements of the automatic transmission are, in emergency operation, actuated in unpressurized fashion, while the actuation pressure assumes its maximum value. In the event of a transition to hydraulic emergency operation, the electromechanical locking mechanism of the parking lock is also deactivated, with the result that inadequate hydraulic actuation of the parking lock device during emergency operation results in an immediate actuation of the parking lock device in the direction of the engaged operating state.

To be able to briefly compensate undersupplied operating states of the hydraulic system during a normal operating state of the automatic transmission, and to be able to operate the automatic transmission with high spontaneity over a large operating range of a vehicle drivetrain, it is possible for the above-described primary actuation pressure circuit to be implemented with a hydraulic fluid volume accumulator known from DE 10 2013 209 932 A1. For this purpose a hydraulic fluid volume is temporarily stored counter to a spring force of a spring device in the region of the hydraulic fluid volume accumulator, which hydraulic fluid volume can, in accordance with demand, be introduced into the line system of the hydraulic system downstream of a check valve device. During hydraulic emergency operation of the automatic transmission, the hydraulic fluid volume accumulator is fully charged by the actuation pressure set to a maximum, and is preloaded to its maximum pressure value.

If a vehicle in which the transmission is in hydraulic emergency operation is shut down, a transmission main pump driven by the drive machine conveys no further hydraulic fluid volume into the hydraulic system, as is known. The previously set maximum actuation pressure thereby collapses, until it reaches the maximum pressure level of the hydraulic fluid volume accumulator. From this point in time onward, all actuated pressures in the hydraulic system are determined by the discharge pressure of the hydraulic fluid volume accumulator, and as a result both the actuation pressure and a pressure set with a falling characteristic curve in the region of a actuation pressure regulator assume the same pressure level.

From said point in time onward, the gradient with which the actuation pressure in the primary pressure circuit is dissipated is dependent only on the leakage of the primary pressure circuit, and is thus highly dependent on the present operating temperature of the transmission. Particularly in the presence of low operating temperatures, the leakage volume flows of the primary pressure circuit are very small. Since the minimum discharge pressure of the hydraulic fluid volume accumulator is above the self-holding pressure threshold of the parking lock valve, the engagement of the parking lock after the shutdown of the vehicle is delayed, however to an undesired extent.

SUMMARY OF THE INVENTION

The object of the present invention is to provide an electrohydraulic transmission control system having a parking lock valve, by which a transmission can be operated in an optimized manner in terms of efficiency and with high spontaneity, and by which a parking lock can, even in the event of a transition to emergency operation, be transferred into the engaged operating state within defined operating times.

Accordingly, through a hydraulic transmission control system having a parking lock valve by which a parking lock cylinder of a parking lock device can be charged with an actuation pressure which is adjustable in an operating-state-dependent manner by at least one pilot pressure which is adjustable in the region of an electrohydraulic pressure adjuster and/or a pressure source, it is possible for the parking lock valve, above a defined pressure level of the actuation pressure, to be held in a defined operating state in which the actuation pressure can be applied to the parking lock cylinder.

According to the invention, a valve device is provided to which the actuation pressure and the pilot pressure can be applied. The valve device is designed such that, when the pressure levels of the actuation pressure and of the pilot pressure at least approximately correspond to one another, the region of the electrohydraulic transmission control system which conducts the actuation pressure is, upstream of the parking lock valve, operatively connected to a pressure region in the region of the valve device, a pressure of the pressure region being lower than the defined pressure level of the actuation pressure.

In this way, it is ensured in a simple manner and during the normal operation of the electrohydraulic transmission control system that the parking lock device can be held in the disengaged operating state by a low actuation pressure with an efficiency-optimized pressure level. At the same time, the pressure level of the actuation pressure for holding the parking lock valve in the defined operating state is ensured even during emergency operation. Furthermore, in the event of a shutdown of a vehicle proceeding from emergency operation, which causes a hydraulic fluid volume accumulator to be discharged into the primary pressure circuit of the electrohydraulic transmission control system or more specifically into the actuation-pressure-conducting region of the electrohydraulic transmission control system owing to the drop in a actuation pressure, a desired spontaneous engagement of a parking lock device is not impeded.

This results from the fact that the actuation-pressure-conducting region of the electrohydraulic transmission control system is then connected by the valve device to the pressure region, and, by the additional leakage of the electrohydraulic transmission control system that then occurs in the region of the valve device, the actuation pressure falls to a pressure level below the self-holding pressure level within desired short operating times, and the self-holding action of the parking lock valve is deactivated within a time period required for a spontaneous engagement of the parking lock device.

In an embodiment of the electrohydraulic transmission control system which is of simple design and expedient from a structural space aspect, the actuation pressure can be applied in the region of a control surface of a valve slide of the valve device, the valve slide being longitudinally displaceable in a housing, the actuation pressure thereby acting in a direction of an operating state of the valve device in which the region of the electrohydraulic transmission control system which conducts the actuation pressure is isolated from the pressure region in the region of the valve device. It is thus advantageously ensured that during normal operation of the electrohydraulic transmission control system, the additional leakage of the electrohydraulic transmission control system that can be activated in the region of the valve device is blocked by the actuation pressure, and the actuation pressure is available as desired.

If the pilot pressure can be applied in the region of a further control surface of a valve slide of the valve device so as to act in a direction of a further operating state of the valve device in which the region of the electrohydraulic transmission control system which conducts the actuation pressure is connected to the pressure region in the region of the valve device, it is in turn ensured that, during normal operation of the electrohydraulic transmission control system, during which the actuation pressure is normally higher than the pilot pressure, the additional leakage is reliably closed, and, during emergency operation, in the event of a shutdown of the hydraulic supply of the electrohydraulic transmission control system caused for example by a shutdown of a drive machine, said additional leakage is enabled in a simple manner in the region of the valve device, and, owing to the opened leakage in the region of the valve device, the pressure level of the actuation pressure falls within short operating times to a pressure level at which the self-holding action of the parking lock valve is deactivated and the parking lock device can be transferred as desired into its engaged operating state.

If a spring device acts on the valve slide of the valve device, said spring device acting in the direction of the operating state of the valve device in which the region of the electrohydraulic transmission control system which conducts the actuation pressure is connected to the pressure region in the region of the valve device, the valve device is transferred into a defined operating state in the unpressurized operating state of the electrohydraulic transmission control system owing to the spring force of the spring device acting on the valve slide of the valve device, thus reducing an actuation effort for the electrohydraulic transmission control system in a desired manner.

In an advantageous refinement of the electrohydraulic transmission control system, the region of the electrohydraulic transmission control system which conducts the actuation pressure can be placed in operative connection with the pressure region by a throttle device arranged upstream of the valve device. As a result of the arrangement of the throttle device upstream of the valve device, it is ensured, upon a resumption of operation of a vehicle equipped with the electrohydraulic transmission control system in the region of a transmission, that the actuation pressure or, more specifically, the actuation pressure is built up as desired in the actuation-pressure-conducting region of the electrohydraulic transmission control system, and the additional leakage of the electrohydraulic transmission control system is closed by the actuation pressure during normal operation.

If the control surface and the further control surface are of at least approximately the same size, the actuating forces which result from the prevailing actuation pressure and from the prevailing pilot pressure and which act on the valve slide cancel one another, and the valve slide of the valve device can be transferred, with a low spring force of the spring device acting on the valve slide, into the operating state that connects the actuation-pressure-conducting region of the electrohydraulic transmission control system to the pressure region.

In an embodiment of the electrohydraulic transmission control system which is expedient in terms of installation space, the actuation pressure can be applied in the region of a first valve pocket of the valve device and, downstream of the throttle device, in the region of a second valve pocket of the valve device, the second valve pocket being spaced apart from the first valve pocket in an axial direction.

In an easily actuable embodiment of the electrohydraulic transmission control system, the second valve pocket is, in the further operating state of the valve device, operatively connected by the valve slide to a third valve pocket, which in turn is connected to the pressure region, said operative connection being shut off by the valve slide when the valve device is in the defined operating state.

In an advantageous variant of the electrohydraulic transmission control system, the parking lock valve, during normal operation of the electrohydraulic transmission control system, can be charged with a pressure signal which is adjustable in the region of a further electrohydraulic pressure adjuster and which can be applied to the parking lock valve so as to act in the direction of the defined operating state of the parking lock valve. Thus, during normal operation of the electrohydraulic transmission control system, not only the actuation pressure of the parking lock device prevails at the parking lock valve but also, during defined operating states, a further pressure signal by which the parking lock valve can be actuated in the direction of the operating state which holds the parking lock device hydraulically in the disengaged state. During such operating state profiles, the actuation pressure can, in relation to an operating state of the parking lock valve during which the parking lock valve is held in its defined operating state by the actuation pressure alone, be reduced to an extent which improves the efficiency of the transmission, and it is still possible for the parking lock valve to be arrested in the defined operating state.

If the parking lock valve, during normal operation of the electrohydraulic transmission control system, can be charged with a pressure signal which is adjustable in the region of an additional electrohydraulic pressure adjuster and which can be applied to the parking lock valve in a direction of action counter to the defined operating state, the parking lock valve can be transferred, counter to the self-holding action, into an operating state in which the actuation pressure in the region of the parking lock valve is isolated from the parking lock cylinder and the parking lock device can be engaged as desired.

If the pressure signal which can be adjusted in the region of the electrohydraulic pressure adjuster can additionally be applied in the region of a actuation pressure valve, the actuation pressure being adjustable by the actuation pressure valve in a manner dependent on the pressure signal and on a pressure provided by a further pressure source, it is the case, with corresponding design of the electrohydraulic pressure adjuster, that the actuation pressure assumes its maximum value during emergency operation with little effort, and the parking lock valve is reliably transferred into its defined operating state, in which the parking lock device is held in its disengaged operating state.

In an embodiment of the electrohydraulic transmission control system which is of structurally simple design and which can be actuated with little effort, the parking lock valve includes a valve slide which is longitudinally displaceable in a housing and which is acted on counter to the defined operating state of the parking lock valve, by a spring force of a spring device, and to which, in the region of control surfaces, the actuation pressure and the pressure signals can be applied.

The parking lock device can be actuated with little effort, and a disengagement of the parking lock device can be prevented in a structurally simple manner, if the actuation pressure is, in a first switching position of the valve slide of the parking lock valve, isolated from the parking lock cylinder in the region of the parking lock valve.

The electrohydraulic transmission control system according to the invention can be designed expediently in terms of installation space, by a one-piece, stepped valve slide in the region of the parking lock valve, if the pressure signal which is adjustable in the region of the additional electrohydraulic pressure adjuster can be applied in the region of a control surface of the valve slide of the parking lock valve, such that, when the pressure signal is applied, an actuating force acting in the direction of the first switching position acts on the valve slide.

In an embodiment of the electrohydraulic transmission control system according to the invention which is easy to operate, the electrohydraulic pressure adjuster is designed as a pressure adjuster with a falling pressure characteristic curve versus the actuation current, and the further electrohydraulic pressure adjuster and the additional electrohydraulic pressure adjuster are designed as pressure adjusters with a rising pressure characteristic curve versus the actuation current, whereas the actuation pressure increases with increasing pressure signal of the electrohydraulic pressure adjuster, the actuation pressure of the shift element during emergency operation being at least approximately equal to zero or having a pre-fill pressure level.

Both the features specified in the patent claims and the features specified in the following exemplary embodiment of the electrohydraulic transmission control system according to the invention are suitable, in each case individually or in any desired combination with one another, for refining the subject matter according to the invention.

Further advantages and advantageous embodiments of the electrohydraulic transmission control system according to the invention will emerge from the patent claims and from the exemplary embodiment described in principle below with reference to the drawings.

BRIEF DESCRIPTION OF THE DRAWINGS

The invention is described more specifically by example on the basis of the attached figures. The following is shown.

DETAILED DESCRIPTION

Figure 1:
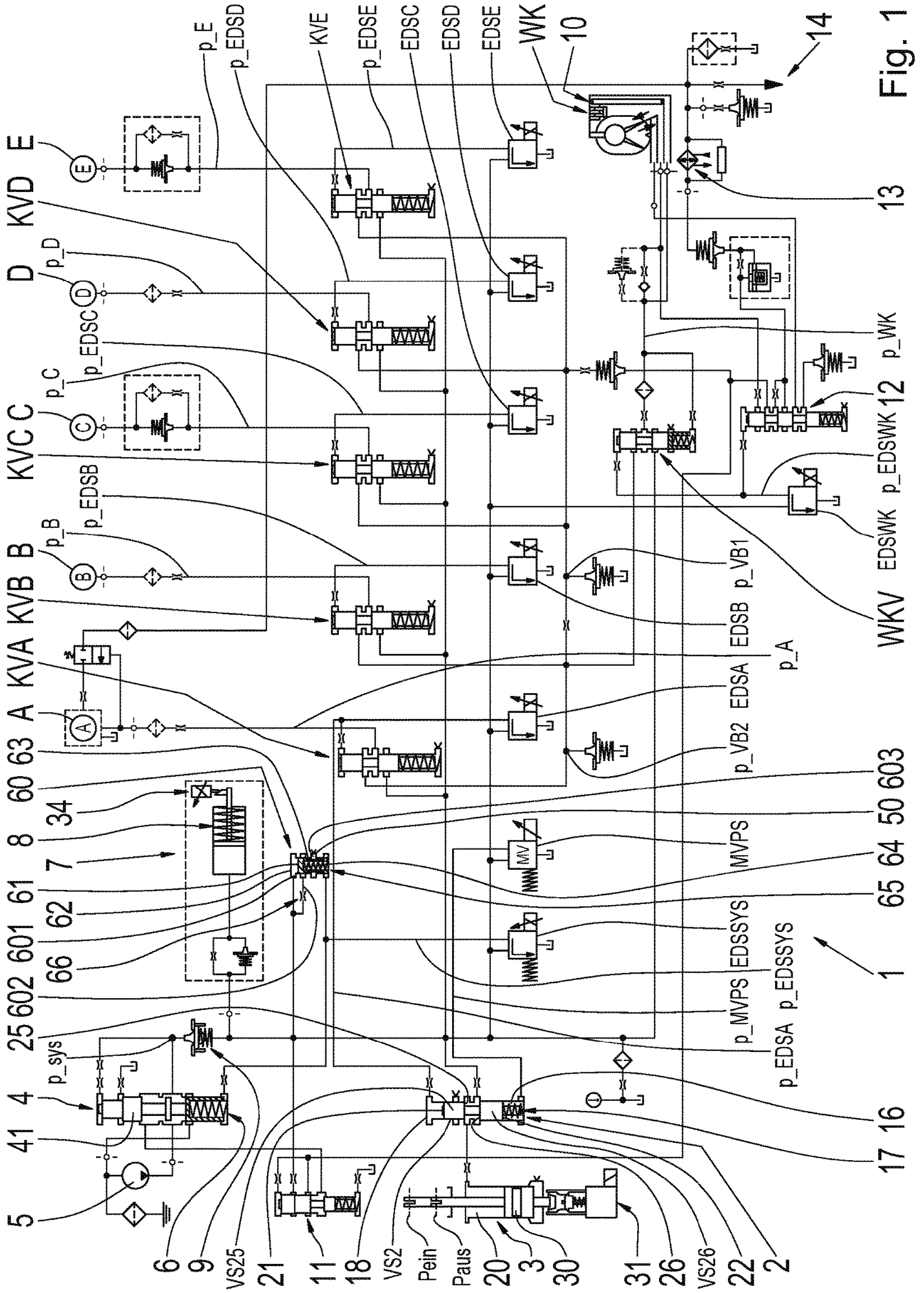
FIG. 1 shows a hydraulic layout of an embodiment of the electrohydraulic transmission control system according to the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a hydraulic layout of an embodiment of an electrohydraulic transmission control system 1 having a parking lock valve 2 by which a parking lock cylinder 3 can be charged with an actuation pressure p_sys. The electrohydraulic transmission control system 1 is provided for actuating a transmission, preferably an automatic transmission, in which eight ratios for forward travel and at least one ratio for reverse travel can be realized. During the realization of the ratios, a power flow can be enabled between a transmission input shaft and a transmission output shaft in each case by activation and deactivation of shift elements A to E of the transmission. Furthermore a neutral operating state can be realized in the region of the transmission during which the power flow between the transmission input shaft and the transmission output shaft is disconnected through corresponding actuation of the shift elements A to E. Furthermore a parking operating state can be realized by the transmission during which the transmission output shaft is, in a manner known per se, held rotationally fixed by a parking lock device which can be actuated by the parking lock cylinder 3.

The shift elements A to E can be charged with actuation pressures p_A to p_E which are adjustable in the region of valve devices KVA to KVE, and in the non-actuated operating state, a pre-fill pressure p_VB1 or p_VB2 prevails at these. Furthermore a converter lock-up clutch WK can be charged with an actuation pressure p_WK which is adjustable in the region of a converter clutch valve WKV. Electrohydraulic pressure adjusters EDSA to EDSE and EDSWK are assigned to each of the valve devices KVA to KVE and WKV, the actuation pressure p_sys which is adjustable in the region of a actuation pressure valve 4 prevailing at the electrohydraulic pressure adjusters EDSA to EDSE and EDSWK, in the region of which in each case a pilot pressure p_EDSA to p_EDSE and p_EDSWK can be adjusted.

By a preferably mechanically driven pump device 5, which constitutes a pressure source of the electrohydraulic transmission control system 1, a supply pressure is provided which prevails in the region of the actuation pressure valve 4 when a drive machine of a vehicle drivetrain including the gearbox is active. At the actuation pressure valve 4, a pilot pressure p_EDSSYS can be applied which is adjustable in the region of an electrohydraulic pressure adjuster EDSSYS, the pilot pressure p_EDSSYS acting in the same direction as a spring device 6 to a valve slide 41 of the actuation pressure valve 4, wherein, in the present case, the actuation pressure p_sys increases with increasing pilot pressure p_EDSSYS.

In order to be able, in certain operating situations of the transmission, to briefly compensate instances of undersupply from the pump device 5, a hydraulic fluid volume accumulator 7 is provided, in the region of which a hydraulic fluid volume can be temporarily stored counter to the spring force of a spring device 8, which hydraulic fluid volume can, in accordance with demand, be introduced into the line system of the electrohydraulic transmission control system 1 downstream of a check valve device 9. In this way a hydraulic supply can be provided to the transmission control system 1 as desired within short operating times.

In addition to the shift elements A to E the transmission includes a launch component 10 which in the present case is designed as a hydrodynamic torque converter and which can be locked up, in a manner dependent on the operating state, by the converter lock-up clutch WK. The launch component 10 and the converter lock-up clutch WK can be actuated as desired not only by the converter clutch valve WKV but also by further valve devices 11 and 12. Downstream of the valve device 12 there is provided a cooler 13 which is connected upstream of a lubricating circuit 14.

In the actuated operating state of the shift elements A to E, the valve devices KVA to KVE are pilot-operated by the electrohydraulic pressure adjusters EDSA to EDSE in each case by pilot pressures p_EDSA to p_EDSE, in such a way that the actuation pressure p_sys prevailing in each case in the region of the valve devices KVA to KVE is applied, having been correspondingly converted as required, in the region of actuation pistons (not illustrated any more detail) of the shift elements A to E, in each case as actuation pressure p_A to p_E. Here, the actuation pressure p_sys corresponds in each case to the maximum actuation pressure p_A to p_E that can be realized.

In order to be able to charge the parking lock cylinder 3, in accordance with demand, with the actuation pressure p_sys for disengaging the parking lock device or for hydraulically holding the parking lock device in the disengaged state via the parking lock valve 2, the pilot pressure p_EDSA, which is adjustable in the region of the electrohydraulic pressure adjuster EDSA, can be applied in the region of a control surface 21 of a valve slide VS2 of the parking lock valve 2. Here, the valve slide VS2 of the parking lock valve 2 can be transferred by the prevailing pressure signal p_EDSA, counter to the spring force of the spring device 17, into the switching position illustrated in FIG. 1, which corresponds to the disengaged operating state Paus, whereas, when the electrohydraulic transmission control system 1 is in the unpressurized operating state, the valve slide VS2 can be transferred into its second switching position by the spring device 17, the second switching position being shifted relative to the first switching position shown in FIG. 1 and which corresponds to an engaged operating state Pein of the parking lock device.

In addition to the pilot pressure p_EDSA and the actuation pressure p_sys, which simultaneously constitutes the actuation pressure of the parking lock cylinder 3, a pressure signal p_MVPS which is adjustable in the region of a further electrohydraulic pressure adjuster MVPS, which in the present case is designed as a solenoid valve, can be applied in the region of a spring chamber 16 of the parking lock valve 2, in which spring chamber the spring device 17 of the parking lock valve 2 is arranged. In the present case, the spring chamber 16 is delimited by a housing 18 and by the valve slide VS2 of the parking lock valve 2, wherein the pressure signal p_MVPS can be applied in the region of a further control surface 22 of the valve slide VS2 of the parking lock valve 2 so as to act in the same direction as the spring force of the spring device 17. Both the spring force of the spring device 17 and the pressure signal p_MVPS act on the valve slide VS2 in the direction of its shifted switching position.

In the first switching position of the valve slide VS2 as illustrated in FIG. 1, the actuation pressure p_sys additionally prevails at control surfaces 25 and 26 of a first valve slide region VS25 and of a second valve slide region VS26 of the valve slide VS2. The diameter of the first valve slide region VS25 is smaller than the diameter of the second valve slide region VS26. For this reason, the actuation pressure p_sys prevailing in the region of the control surfaces 25 and 26 in the first switching position of the valve slide VS2 results in turn in an actuation force which acts on the valve slide VS2 in the direction of its first switching position, which actuation force is equal to zero in the second switching position of the valve slide VS2 (not illustrated in any more detail) because, in the second switching position of the valve slide VS2, the actuation pressure p_sys prevails neither at the control surface 25 nor at the control surface 26.

In the present case, the control surfaces 21, 22, 25 and 26 of the valve slide VS2 and the spring force of the spring device 17 are coordinated with one another such that, during normal operation of the electrohydraulic transmission control system 1, in which the electrohydraulic pressure adjusters EDSA to EDSE, MVPS and EDSSYS can be fed with current, the parking lock device can be transferred into its engaged operating state or into its disengaged operating state in the manner described in more detail below.

Proceeding from the engaged operating state Pein of the parking lock device, and in the presence of a demand for disengagement of the parking lock device, the parking lock valve 2, the valve slide VS2 of which is then situated in the shifted switching position, is transferred into the operating state illustrated in FIG. 1 by application of the pilot pressure p_EDSA in the region of the control surface 21. This has the effect that the actuation pressure p_sys prevailing at the parking lock valve 2 is transmitted via the parking lock valve 2 in the direction of the parking lock cylinder 3, and a piston chamber 20 of the parking lock cylinder 3 is charged with the actuation pressure p_sys.

Here, a piston 30 of the parking lock cylinder 3 is displaced from its position corresponding to the engaged operating state Pein of the parking lock device into the position corresponding to the disengaged operating state Paus of the parking lock device by the prevailing actuation pressure p_sys counter to a spring device (not illustrated in any more detail) of the parking lock device. When the position that corresponds to the disengaged operating state Paus of the parking lock device is reached, an electrically actuable locking device 31 arrests the piston 30, which is then held redundantly, both by the actuation pressure p_sys and by the locking device 31, in the position that corresponds to the disengaged operating state Paus of the parking lock device.

During normal operation of the electrohydraulic transmission control system 1, if an engagement of the parking lock device is demanded proceeding from the operating state of the parking lock valve 2 as illustrated in FIG. 1 with a simultaneously disengaged parking lock device, the pilot pressure p_EDSA is reduced to zero and, at the same time, the pressure signal p_MVPS of the solenoid valve MVPS is applied to the valve slide VS2 of the parking lock valve 2 in the region of the control surface 22. Here, the control surfaces 22, 25, 26 of the valve slide VS2 and the spring force of the spring device 17 are coordinated with one another such that the valve slide VS2 can be transferred from the first switching position into the second switching position of the valve slide VS2 by the spring device 17 and the pressure signal p_MVPS, despite the actuation pressure p_sys prevailing in the region of the control surfaces 25 and 26, in which second switching position the piston chamber 20 of the parking lock cylinder 3 is connected via the parking lock valve 2 to a substantially unpressurized region 50 of the transmission, which is preferably an oil sump. Furthermore, the locking device 31 is switched into a deenergized state and the piston 30 of the parking lock cylinder 3 is mechanically unlocked, whereby the piston 30 can be displaced by the spring device of the parking lock device into its position that corresponds to the engaged operating state Pein of the parking lock device.

In the present case, the control surfaces 21 to 26 of the valve slide VS2 and the spring force of the spring device 17 are also coordinated with one another such that the valve slide VS2 can be transferred from its first switching position into its second switching position by a pilot pressure p_EDSA of approximately 3.5 bar counter to the spring force of the spring device 17, if the pressure signal p_MVPS of the solenoid valve MVPS is substantially equal to zero or more specifically substantially corresponds to the ambient pressure of the transmission, which basically prevails in all regions of the parking lock valve 2 in addition to the pressure signals and which thus has no effect.

At the latest when the first switching position of the valve slide VS2 is reached, the actuation pressure p_sys prevails again at the control surfaces 25 and 26 of the valve slide VS2. By the actuation pressure p_sys, the self-holding action of the parking lock valve 2 is activated if the actuation pressure p_sys is approximately 2 bar. This means that, in the presence of a actuation pressure p_sys of approximately 2 bar, the valve slide VS2 can no longer be transferred into its second switching position by only the spring device 17.

During normal operation of the transmission control system 1, through corresponding adjustment of the pilot pressure p_EDSA, the shift element A is charged with the actuation pressure p_A, and incorporated into the power flow during the realization of the park operating state, the neutral operating state, the realization of the ratio for reverse travel, and during the realization of the ratios "1" and "2" for forward travel and for the realization of the ratios "7" and "8". The pressure signal or more specifically the pilot pressure p_EDSA is therefore particularly suitable for transferring the parking lock valve 2 from the operating state not illustrated in any more detail in the drawing in the direction of the operating state shown in FIG. 1 counter to the spring device 17 in the manner described above. To prevent undesired disengagement of the parking lock by the then respectively prevailing pressure signal p_EDSA, the valve slide VS2 is charged with the pressure signal p_MVPS in the region of its control surface 22 in the corresponding presence of a demand for engagement of the parking lock device.

If the current-feed of the electrohydraulic transmission control system 1 fails, this has the effect that the pilot pressures p_EDSA to p_EDSE fall to zero owing to the configuration described in more detail below of the electrohydraulic pressure adjusters EDSSYS, MVPS and EDSA to EDSE, whereas the pressure signal p_EDSSYS assumes its maximum value. Furthermore, in the deenergized operating state of the solenoid valve MVPS, the pressure signal p_MVPS is also equal to zero.

This results from the fact that the pressure adjusters EDSA to EDSE are formed in each case with a rising pressure characteristic curve versus the actuation current, whereas the electrohydraulic pressure adjuster EDSSYS has a falling pressure characteristic curve versus the actuation current. Thus, during hydraulic emergency operation of the electrohydraulic transmission control system 1, the actuation pressure valve 4 is charged with the maximum pressure value of the pressure signal p_EDSSYS, whereby the actuation pressure p_sys assumes its maximum value for as long as the pump device 5 provides a corresponding supply pressure. This has the effect that the hydraulic fluid volume accumulator 7 is also charged with the maximum actuation pressure p_sys and gets filled completely.

A detent device 34 of the hydraulic fluid volume accumulator 7 is likewise deactivated in the event of an electrical failure of the electrohydraulic transmission control system 1. The hydraulic fluid volume stored in the region of the hydraulic fluid volume accumulator 7 is introduced, upstream of the parking lock valve 2, into the line system of the transmission control system 1 if the actuation pressure p_sys falls below a defined pressure level of the actuation pressure p_sys, which in the present case lies at approximately 7 bar. To prevent the actuation pressure p_sys from being held for a limited time period at the pressure level of approximately 7 bar, the electrohydraulic transmission control system 1 includes a valve device 60 with the functionality described further below.

For as long as the pump device 5 provides an adequately high supply pressure, the self-holding action of the parking lock valve 2 remains active during emergency operation, and the valve slide VS2 is held in the operating state shown in FIG. 1 by the prevailing actuation pressure p_sys. However, if a drive machine which drives the pump device 5 is deactivated during emergency operation of the transmission control system 1, the pressure level of the actuation pressure p_sys initially falls, for supply-related reasons, to the pressure level of approximately 7 bar provided by the hydraulic fluid volume accumulator 7. As a result, it is only in the event of the self-holding pressure threshold of the actuation pressure p_sys of approximately 2 bar being undershot that the valve slide VS2 is immediately transferred, by the spring device 17, into its first switching position in which the actuation pressure p_sys is isolated from the parking lock cylinder 3 in the region of the parking lock valve 2, and the piston chamber 20 of the parking lock cylinder 3 is ventilated in the direction of the unpressurized region 50 via the parking lock valve 2. Since the locking device 31 of the parking lock cylinder 3 is already deactivated during emergency operation, the parking lock device engages in the desired manner, and a vehicle is transferred into a safe operating state when the parking lock valve 2 has been transferred into its second switching position by the spring device 17.

Since, in the present case, the self-holding pressure threshold of the parking lock valve 2 effective during emergency operation of the transmission control system 1 is lower than the actuation pressure p_sys provided by the hydraulic fluid volume accumulator 7 in the event of the deactivation of the pressure supply from the pump, it is the case, despite the drop in the actuation pressure p_sys to the pressure level of the hydraulic fluid volume accumulator 7, that the valve slide VS2 is initially not immediately transferred by the spring device 17, owing to the design, into its first switching position, and the parking lock device initially is not transferred into its engaged operating state.

To nevertheless be able to transfer the parking lock device into its engaged operating state immediately after the deactivation of the pressure supply from the pump during emergency operation of the transmission control system 1, the valve device 60 is based on the following mode of operation:

During the operation of the electrohydraulic transmission control system 1, the actuation pressure p_sys and the pilot pressure p_EDSSYS prevail at the valve device 60. Here, the valve device 60 is designed such that, when the pressure levels of the actuation pressure p_sys and of the pilot pressure p_EDSSYS at least approximately correspond to one another, the region of the electrohydraulic transmission control system 1 which conducts the actuation pressure p_sys is, upstream of the parking lock valve 2, operatively connected to a pressure region in the region of the valve device 60, a pressure of the pressure region being lower than the self-holding pressure level of the parking lock valve 2 or, more specifically, being lower than the defined pressure level of the actuation pressure p_sys. In the present case, the pressure region corresponds to the unpressurized region 50 of the transmission in which ambient pressure prevails.

Here, the actuation pressure p_sys prevails in the region of a control surface 61 of a valve slide 63 of the valve device 60, the valve slide 63 being longitudinally displaceable in a housing 62 so as to act in a direction of an operating state of the valve device 60 in which the region of the electrohydraulic transmission control system 1 which conducts the actuation pressure p_sys is isolated from the pressure region 50 in the region of the valve device 60.

Furthermore, the pilot pressure p_EDSSYS prevails in the region of a further control surface 64 of the valve slide 63 in a direction of action toward a further operating state of the valve device 60 in which that region of the electrohydraulic transmission control system 1 which conducts the actuation pressure p_sys is connected to the pressure region 50 in the region of the valve device 60. Furthermore, a spring device 65 acts on the valve slide 63 of the valve device 60, said spring device 65 acting in the direction of the operating state of the valve device 60 in which the region of the electrohydraulic transmission control system 1 which conducts the actuation pressure p_sys is connected to the pressure region 50 in the region of the valve device 60. In the present case, the further operating state of the valve device 60 is shown in FIG. 2, whereas the operating state of the valve device 60 is shown in FIG. 3.

It is additionally the case that the region of the electrohydraulic transmission control system 1 which conducts the actuation pressure p_sys can be placed in operative connection with the pressure region 50 by a throttle device 66 arranged upstream of the valve device 60. In the exemplary embodiment of the valve device 60 illustrated in the drawing, the control surface 61 and the further control surface 64 are of equal size, whereby the actuating forces that act on the valve slide 63 correspond to one another in a state of pressure equilibrium, said actuating forces resulting from the actuation pressure p_sys and the pilot pressure p_EDSSYS, and the valve slide 63 can be transferred into or held in the switching position illustrated in FIG. 2 by the spring device 65 alone.

The actuation pressure p_sys prevails in the region of a first valve pocket 601 of the valve device 60 and, downstream of the throttle device 66, in the region of a second valve pocket 602 of the valve device 60, the second valve pocket 602 being spaced apart from the first valve pocket 601 in an axial direction. In the further operating state of the valve device 60 as illustrated in FIG. 2, the second valve pocket 602 is operatively connected by the valve slide 63 to a third valve pocket 603, which in turn is connected to the pressure region 50. The operative connection between the second valve pocket 602 and the third valve pocket 603 is shut off by the valve slide 63 in the defined operating state of the valve device 60.

Figure 2:
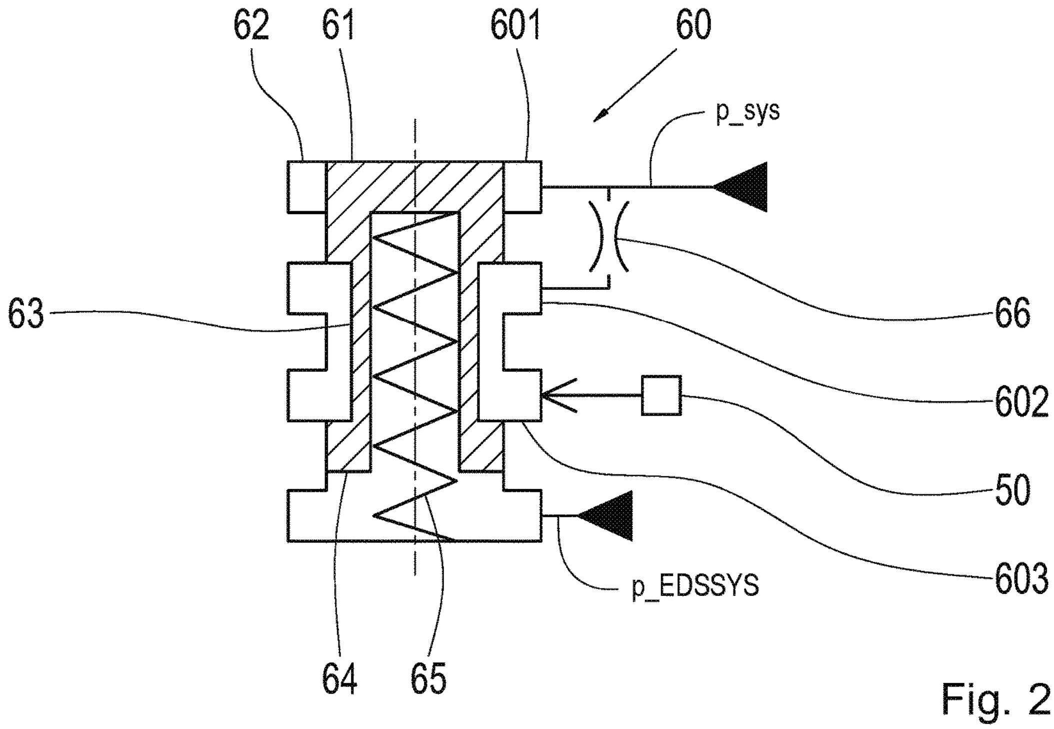
FIG. 2 is a schematic view of a valve device of the electrohydraulic transmission control system as shown in FIG. 1 in a first operating state.
Figure 3:
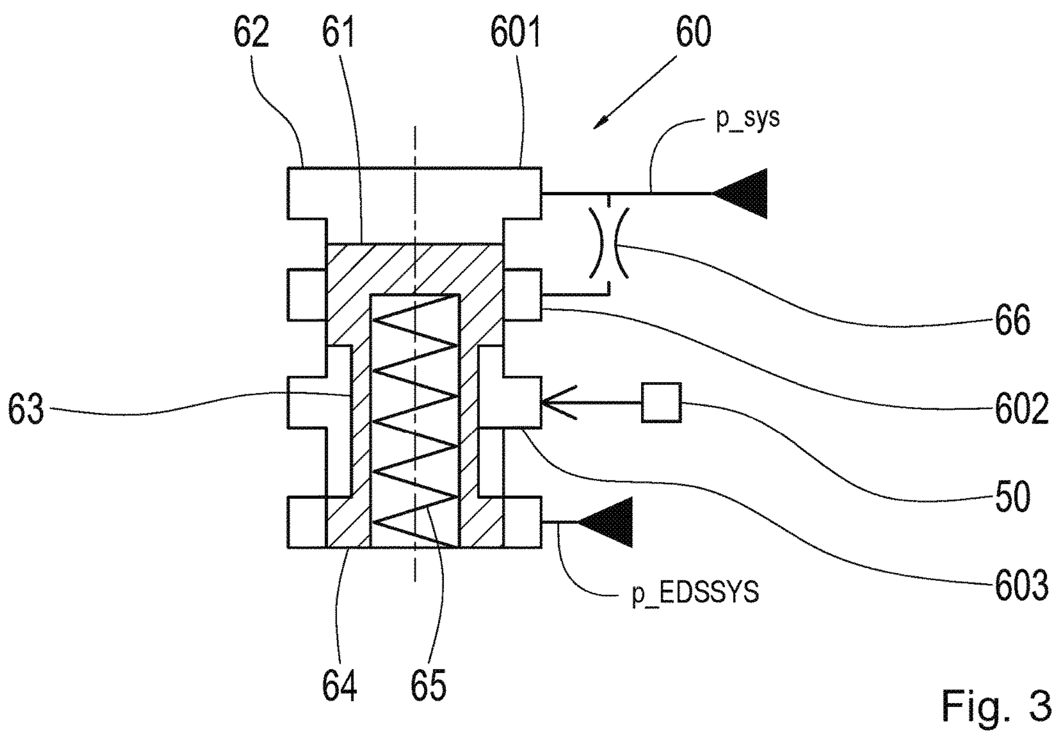
FIG. 3 is a schematic view, corresponding to FIG. 1, of the valve device in a second operating state.

Owing to the configuration of the valve device 60 as described in more detail above, it is ensured that, in the shut-down operating state of the vehicle and thus in the unpressurized operating state of the electrohydraulic transmission control system 1, the valve slide 63 of the valve device 60 is in the switching position illustrated in FIG. 2, in which the region of the electrohydraulic transmission control system 1 which conducts the actuation pressure p_sys is ventilated in the direction of the unpressurized region 50, or more specifically is switched into an unpressurized state.

Upon a start-up of a vehicle, during normal operation of the electrohydraulic transmission control system, the valve device 60 is charged with the actuation pressure p_sys in the region of the control surface 61. Furthermore, the region of the electrohydraulic transmission control system 1 which conducts the actuation pressure p_sys is initially also connected to the unpressurized region 50 by the throttle device 66 and the two valve pockets 602 and 603. Owing to the throttling action of the throttle device 66, a pressure level is built up in the region of the electrohydraulic transmission control system 1 which conducts the actuation pressure p_sys, said pressure level being higher than the pressure level of the pilot pressure p_EDSSYS and transferring the valve slide 63 of the valve device 60, counter to the pilot pressure p_EDSSYS and the spring force of the spring device 65, into the operating state shown in FIG. 3, in which the region of the electrohydraulic transmission control system 1 which conducts the actuation pressure p_sys is no longer connected to the unpressurized region 50, and the additional leakage, which can be activated by the valve device 60, of the region of the electrohydraulic transmission control system 1 which conducts the actuation pressure p_sys is closed.

Owing to the configuration of the valve device 60, it is ensured, in the event of a deactivation of the pressure supply during emergency operation of the electrohydraulic transmission control system 1, that the parking lock device is engaged as desired despite the hydraulic fluid volume being displaced from the hydraulic fluid volume accumulator 7 into the region of the electrohydraulic transmission control system 1 which conducts the actuation pressure p_sys, and the associated maintaining of the pressure level of the actuation pressure p_sys above the self-holding pressure threshold of the parking lock valve 2.

This results from the fact that, in the event of the deactivation of the pressure supply of the electrohydraulic transmission control system 1 during emergency operation, the actuation pressure p_sys and the pilot pressure p_EDSSYS abruptly correspond to one another, and the valve slide 63 of the valve device 60 is then transferred by the spring device 65 from the switching position shown in FIG. 3 into the switching position illustrated in FIG. 2, in which the region of the electrohydraulic transmission control system 1 which conducts the actuation pressure p_sys is ventilated in the defined manner by the valve device 60 in the direction of the unpressurized region 50 by the additional leakage that is then activated. Said ventilation of the region of the electrohydraulic transmission control system 1 which conducts the actuation pressure p_sys results in a desired decrease of the actuation pressure p_sys within a defined operating time to below the self-holding pressure level of the parking lock valve 2, whereby the self-holding action of the parking lock valve 2 is deactivated, and in turn, the parking lock cylinder 3 is ventilated in the manner described above via the parking lock valve 2 in the direction of the unpressurized region 50, whereby the parking lock can be engaged as desired.

Modifications and variations can be made to the embodiments illustrated or described herein without departing from the scope and spirit of the invention as set forth in the appended claims.

REFERENCE DESIGNATIONS

1 Electrohydraulic transmission control system
2 Parking lock valve
3 Parking lock cylinder
4 Actuation pressure valve
5 Pump device
6 Spring device of the actuation pressure valve
7 Hydraulic fluid volume accumulator
8 Spring device of the hydraulic fluid volume accumulator
9 Check valve device
10 Starting component, torque converter
11, 12 Valve device
13 Cooler
14 Lubrication circuit
16 Spring chamber
17 Spring device
18 Housing
20 Piston chamber
21 Control surface
22 Further control surface
25 Control surface
26 Control surface
30 Piston of the parking lock cylinder
31 Interlock device of the parking lock cylinder
34 Detent device of the hydraulic fluid volume accumulator
41 Valve slide of the actuation pressure valve
50 Unpressurized region
60 Valve device
61 Control surface
62 Housing
63 Valve slide
64 Further control surface
65 Spring device
66 Throttle device
601 First valve pocket
602 Second valve pocket
603 Third valve pocket
A to E Shift element
EDSA to EDSE Electrohydraulic pressure adjuster
EDSSYS Electrohydraulic pressure adjuster
EDSWK Electrohydraulic pressure adjuster
KVA to KVE Valve device
MVPS Electrohydraulic pressure adjuster, solenoid valve
p_A to p_E Actuation pressure
Paus, Pein Operating state of the parking lock
p_MVPS Pressure signal
p_EDSSYS Pressure signal
p_EDSA to p_EDSE Pilot pressure
p_sys Actuation pressure
p_VB1, p_VB2 Pre-fill pressure
p_WK Actuation pressure
VS2 Valve slide of the parking lock valve
VS25, VS26 Valve slide region
WK Converter lock-up clutch
WKV Converter clutch valve

The invention claimed is:

1. An electrohydraulic transmission control system (1), comprising:

a parking lock valve (2) by which a parking lock cylinder (3) of a parking lock device is chargeable with an actuation pressure (p_sys), the actuation pressure (p_sys) adjustable in an operating-state-dependent manner by at least one pilot pressure (p_EDSSYS), the at least one pilot pressure (p_EDSSYS) adjustable with an electrohydraulic pressure adjuster (EDSSYS), a pressure source (7), or both the electrohydraulic pressure adjuster (EDSSYS) and the pressure source (7); and a valve device (60) to which the actuation pressure (p_sys) and the pilot pressure (p_EDSSYS) are applicable;

wherein the parking lock valve (2) is holdable in a defined operating state in which the actuation pressure (p_sys) is applicable to the parking lock cylinder (3) when the actuation pressure (p_sys) applied to the parking lock valve (2) is above a defined pressure level of the actuation pressure (p_sys), and wherein the valve device (60) is configured such that a portion of the electrohydraulic transmission control system (1) that conducts the actuation pressure (p_sys) upstream of the parking lock valve (2) is operatively connected to a pressure region (50) proximate the valve device (60) when pressure levels of the actuation pressure (p_sys) and of the pilot pressure (p_EDSSYS) applied to the valve device (60) at least approximately correspond to each other, a pressure of the pressure region (50) being less than the defined pressure level.

2. The electrohydraulic transmission control system according to claim 1, wherein the actuation pressure (p_sys) is applicable to a control surface (61) of a valve slide (63) of the valve device (60), the valve slide (63) being longitudinally displaceable in a housing (62), the actuation pressure (p_sys) urging the valve slide (63) towards an operating state of the valve device (60) in which the portion of the electrohydraulic transmission control system (1) which conducts the actuation pressure (p_sys) is blocked from the pressure region (50) by the valve slide (63).

3. The electrohydraulic transmission control system according to claim 2, wherein the pilot pressure (p_EDSSYS) is applicable at a further control surface (64) of the valve slide (63) to urge the valve slide (63) towards a further operating state of the valve device (60) in which the portion of the electrohydraulic transmission control system (1) which conducts the actuation pressure (p_sys) is connected to the pressure region (50) through the valve device (60).

4. The electrohydraulic transmission control system according to claim 3, wherein a spring device (65) is connected to the valve slide (63), the spring device (65) urging the valve device (60) towards the further operating state of the valve device (60) in which the portion of the electrohydraulic transmission control system (1) which conducts the actuation pressure (p_sys) is connected to the pressure region (50) through the valve device (60).

5. The electrohydraulic transmission control system according to claim 2, wherein the portion of the electrohydraulic transmission control system (1) which conducts the actuation pressure (p_sys) is operatively connectable with the pressure region (50) through a throttle device (66) arranged upstream of the valve device (60).

6. The electrohydraulic transmission control system according to claim 3, wherein the control surface (61) and the further control surface (64) are of at least approximately the same size.

7. The electrohydraulic transmission control system according to claim 6, wherein the actuation pressure (p_sys) is applicable at a first valve pocket (601) of the valve device (60) and downstream of the throttle device (66) at a second valve pocket (602) of the valve device (60), the second valve pocket (602) being spaced apart from the first valve pocket (601) in an axial direction.

8. The electrohydraulic transmission control system according to claim 7, wherein:

the second valve pocket (602) is operatively connected by the valve slide (63) to a third valve pocket (603) in the further operating state of the valve device (60), and the operative connection is shut off by the valve slide (63) when the valve device (60) is in the operating state; and the third valve pocket (603) is connected to the pressure region (50) in the further operating state of the valve device (60).

9. The electrohydraulic transmission control system according to claim 1, wherein, during normal operation of the electrohydraulic transmission control system (1), the parking lock valve (2) is chargeable with a pressure signal (p_EDSA) which is adjustable by a further electrohydraulic pressure adjuster (EDSA) and which is applicable to the parking lock valve (2) to urge the parking lock valve (2) towards the defined operating state of the parking lock valve (2).

10. The electrohydraulic transmission control system according to claim 9, wherein, during normal operation of the electrohydraulic transmission control system (1), the parking lock valve (2) is chargeable with a pressure signal (p_MVPS) which is adjustable by an additional electrohydraulic pressure adjuster (MVPS) and which is applicable to the parking lock valve (2) to urge the parking lock valve (2) away from the defined operating state of the parking lock valve (2).

11. The electrohydraulic transmission control system according to claim 10, wherein the parking lock valve (2) comprises a valve slide (VS2) which is longitudinally displaceable in a housing (18), the valve slide (VS2) connected to a spring device (17) that urges the parking lock valve (2) away from the defined operating state of the parking lock valve (2), the actuation pressure (p_sys) and the pressure signals (p_EDSA, p_MVPS) applicable to the valve slide (VS2) at a plurality of control surfaces (21 to 27).

12. The electrohydraulic transmission control system according to claim 11, wherein the actuation pressure (p_sys) is blocked from the parking lock cylinder (3) by the parking lock valve (2) in a first switching position of the valve slide (VS2) of the parking lock valve (2).

13. The electrohydraulic transmission control system according to claim 12, wherein the pressure signal (p_MVPS) which is adjustable by the additional electrohydraulic pressure adjuster (MVPS) is applicable at a first control surface (22) of the plurality of control surfaces (21 to 27) such that the pressure signal (p_MVPS) which is adjustable by the additional electrohydraulic pressure adjuster (MVPS) urges the valve slide (VS2) towards the first switching position when the pressure signal (p_MVPS) which is adjustable by the additional electrohydraulic pressure adjuster (MVPS) urges is applied.

14. The electrohydraulic transmission control system according to claim 10, wherein the electrohydraulic pressure adjuster (EDSSYS) is a pressure adjuster with a falling pressure characteristic curve versus an actuation current, the further electrohydraulic pressure adjuster (EDSA) and the additional electrohydraulic pressure adjuster (MVPS) are pressure adjusters with a rising pressure characteristic curve versus the actuation current, and the actuation pressure (p_sys) increases with increasing pilot pressure (p_EDSSYS) of the electrohydraulic pressure adjuster (EDSSYS).

15. The electrohydraulic transmission control system according to claim 9, wherein the pilot pressure (p_EDSSYS) which is adjustable with the electrohydraulic pressure adjuster (EDSSYS) is additionally applicable to an actuation pressure valve (4), the actuation pressure (p_sys) being adjustable by the actuation pressure valve (4) in a manner dependent on the pilot pressure (p_EDSSYS) and by a pressure provided by a further pressure source (5).

* * * * *